United States Patent
Flaherty et al.

(10) Patent No.: US 6,943,982 B2
(45) Date of Patent: Sep. 13, 2005

(54) LOCKOUT MECHANISM FOR I/O STATION OF AUTOMATED LIBRARY

(75) Inventors: Steven Martin Flaherty, Tucson, AZ (US); Aaron Lyle Herring, Tucson, AZ (US); Shawn Michael Nave, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 10/210,392

(22) Filed: Aug. 1, 2002

(65) Prior Publication Data

US 2004/0021979 A1 Feb. 5, 2004

(51) Int. Cl.[7] .............................................. G11B 15/00
(52) U.S. Cl. ..................................................... 360/96.5
(58) Field of Search .................. 360/92, 96.5; 720/631, 720/639, 646, 647, 730, 731

(56) References Cited

U.S. PATENT DOCUMENTS 6,141,180 A    10/2000  Smith .......................... 360/96.5
6,320,722 B1 *  11/2001  Tsuchiya et al. ........... 360/96.5
2003/0058747 A1 *  3/2003  Smith et al. .................... 369/1

* cited by examiner

*Primary Examiner*—George Letscher
(74) *Attorney, Agent, or Firm*—Antonio R. Durando; Quarles & Brady Streich Lang LLP

(57) ABSTRACT

A lockout lever is hinged on the side of a slot in an I/O station of an automated library. The lever includes a leading blade and a trailing blade that protrude into the slot. The leading blade is urged open by a spring. When an LTO cartridge or a DLT cartridge in the wrong position is introduced into the slot, the forward motion of the cartridge is impeded by its substantially flat side that faces both the leading and trailing blades and prevents rotation of the lockout lever. When a DLT cartridge is introduced correctly, the cavity in its side accommodates the leading blade as the trailing blade is pushed out of the slot. The leading blade is sized to clear the gap in the door hinge of the DLT cartridge when removed from the interior of the station.

30 Claims, 8 Drawing Sheets

LOCKOUT MECHANISM FOR I/O STATION OF AUTOMATED LIBRARY

BACKGROUND OF THE INVENTION

1. Field of the Invention

This invention relates generally to automated data-storage libraries and, in particular, to a lockout mechanism for ensuring that a data cartridge is inserted correctly into the receiving cell of the input/output station of a library.

2. Description of the Related Art

The portability of magnetic tape cartridges makes it possible to store them in readily accessible multi-cell libraries, so that large amounts of data can be saved and retrieved at will using automated equipment. When, for example, a particular cartridge is required for use in a computer's I/O device, the unit is retrieved by a robot from the cell where it has been stored in a library and it is automatically loaded for processing.

Cartridges are initially placed into libraries manually through input/output stations which consist of stacks of individual through-slots with an exterior opening adapted to receive a cartridge of a predetermined size and configuration. For example, FIG. 1 illustrates an IBM 3584 Automated Library that incorporates an I/O station 10 with a cartridge 12 inserted half-way into a receiving through-slot 14. Each slot has also an interior opening (not shown) through which the cartridge is removed by a robot for automated placement in a library storage cell or drive. The picker mechanism through which each cartridge is transferred includes gripper arms that hold the cartridge and guide it in and out of the I/O station, and similarly in and out of the library cell, computer peripheral, or other device being used. The cartridges have retaining features that permit gripper arms to latch on to the cartridge by means of appropriate locating and gripping notches or equivalent structural features built into the case of the cartridge. Accordingly, commercial cartridge formats are standardized to provide uniformity of construction and interchangeability of operation between cartridges produced by different manufacturers.

In operation, each cartridge 12 is initially inserted manually by an operator into a slot 14 of a receiving cell in the I/O station. The cartridge must be positioned correctly in order for the gripper arms to be able to retrieve it from the other side of the cell. Thus, only one of the eight sides of a conventional cartridge is acceptable for the picker mechanism inside the library and any other orientation of the cartridge would be incorrect and cause a failure of the automated system. The problem is worse with libraries that operate with multiple types of cartridges and that, therefore, provide an even smaller ratio of correct options. If two formats are used, for example, only one out of sixteen possible alternatives is correct.

Two of the cartridge formats most widely used currently around the world are the so called DLT (digital linear tape) and LTO (linear tape open) formats, each characterized in detail by corresponding ECMA (European Computer Manufacturers Association) 286 and 319 standards. Accordingly, IBM's 3584 Library accommodates both types of cartridge and is equipped with corresponding I/O units with cells selectively dedicated to one cartridge or the other. Each cartridge format features prescribed structural attributes adapted to function with conforming standard features in the automated mechanisms of a corresponding drive, picker and library system. For example, a typical DLT format cartridge 20, such as IBM®'s DLTtape® IV Cartridge illustrated in FIG. 2, is characterized by a hinged door 22 on the front side 24 of the cartridge. When the DLT cartridge is inserted into a drive, a stationary device penetrates a gap 26 in the door hinge 28 and presses against a spring-loaded latch 30 to automatically release the door 22 and swing it open toward the front of the cartridge. As a result, the tape's leader inside the cartridge (not seen) can be accessed by the drive's mechanism. As the door 22 opens, the door hinge 28 rotates inwardly toward the right side 32 of the cartridge. Accordingly, the right side of the DLT cartridge 20 features a progressively deepening cavity 34 designed to accommodate the door hinge 28 when the door 22 is fully open. The shallower portion of the cavity 34 also features two side ribs 36.

Thus, the right side 32 of the DLT cartridge contains several pronounced structural features that distinguish it from all other sides, as well as from every side of the LTO cartridge. When a DLT cartridge is inserted in an I/O station by an operator, it must be placed top-side up and with the door 22 facing the exterior of the station, as illustrated in FIG. 3; otherwise, the library picker cannot properly grab and retain the cartridge, and the picker may become disabled causing the automated library to go off-line and the stored data to become unaccessible. This possibility of failure is unacceptable in today's world of uninterrupted-service demand. Therefore, it would be very desirable to have a mechanism that prevents the incorrect placement of a DLT cartridge or the placement of another cartridge into the receiving slots of an I/O station designed to handle only DLT cartridges.

U.S. Pat. No. 6,141,180 describes a pivoting lockout that prevents the incorrect placement of a DLT cartridge into a receiving device, such as a tape magazine, a library or a mail slot. The lockout consists of a hinged member with a leading and a trailing edge protruding into the sleeve to be occupied by the cartridge when it is placed in the receiving device. Therefore, the cartridge can be successfully introduced into the device only one way, when the side containing the cavity is facing the hinged lockout member. Because of its configuration and placement, the lockout member is able to clear the ribs 36 and to fit into the cavity 34 of the DLT cartridge (refer to FIG. 2 above) as the cartridge is pushed into the sleeve of the receiving device. Thus, the lockout of the invention prevents the complete insertion of the DLT cartridge unless it is oriented correctly.

The Smith lockout device is not designed for a pass-through sleeve of the type present in I/O stations. It is only concerned with ensuring that the cartridge is placed correctly in a receiving cell from which it is to be extracted later in reverse direction. Accordingly, the door hinge 28 could not clear the two protruding edges of the lockout if the cartridge were to be extracted in pass-through fashion from the interior side of an I/O station. The present invention provides a new design for a lockout mechanism that overcomes this problem and is therefore suitable for use in input/output stations.

BRIEF SUMMARY OF THE INVENTION

The primary objective of this invention is a lockout lever that allows the complete introduction of a DLT cartridge into an I/O station only when it is properly oriented.

Another objective of the invention is a lockout lever that permits the pass-through extraction of the DLT cartridge from the interior side of the I/O station by an automated library picker.

A specific goal of the invention is a lockout lever that also prevents the full insertion of an LTO cartridge into the DLT I/O cell of an IBM 3584 Library.

Finally, an important goal of the invention is a lockout lever that can be easily incorporated into the structure of existing I/O stations of automated libraries.

Therefore, according to these and other objectives, the invention consists of a lockout lever hinged on the side of the receiving slots of a conventional I/O station in an automated library. The lever includes a leading blade and a trailing blade that protrude into the slot of the I/O cell dedicated to DLT cartridges. When the cell is empty, the lockout lever is preferably urged open by a spring, causing its leading blade to be completely out of the slot and its trailing blade to be at its maximum penetration state within the slot. As a result, the leading blade does not obstruct the forward edge of any appropriately sized cartridge being introduced into the slot. As the cartridge moves forward into the slot, its forward edge contacts and pushes the trailing blade of the lockout lever out of the way, causing the lever to pivot around the hinge, which in turn causes the leading blade to encroach into the slot. When an LTO cartridge or a DLT cartridge in the wrong position is introduced into the slot, any additional forward motion of the cartridge is impeded by the substantially flat side that faces the leading blade and prevents the continued rotation of the lockout lever. Instead, when a DLT cartridge is being introduced in the correct orientation, the cavity in the right side of the cartridge is able to accommodate the leading blade of the lockout lever as the trailing blade is pushed out of the slot by the forward motion of the cartridge. Therefore, according to one aspect of the invention, only a DLT cartridge that is placed correctly into the slot can be completely pushed into the I/O unit. Accordingly, this feature provides immediate notice to an operator when he or she attempts to introduce the wrong cartridge or the wrong side of a DLT cartridge into a DLT I/O unit of an automated library.

According to another feature of the invention, the elevational position and the maximum degree of penetration of the leading blade of the lockout lever are selected such that the leading blade clears the gap in the door hinge of the LTO cartridge when the cartridge is removed by the library robot from the interior side of the I/O station. Thus, only a properly positioned LTO cartridge can be fully inserted into the exterior side of the I/O unit of the library and removed from the interior side by a library robot.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only some of the various ways in which the invention may be practiced.

DESCRIPTION OF THE PREFERRED EMBODIMENT OF THE INVENTION

This invention consists of a novel configuration for a lockout mechanism that not only ensures the correct installation of a DLT cartridge into a corresponding receiving slot of a library I/O station, but also enables its complete pass-through and subsequent retrieval by an automated picker from the interior side of the library. Thus, the invention can be used advantageously to provide an immediate awareness of a cartridge that is oriented incorrectly when an operator is manually inserting cartridges into the I/O station.

For the purposes of this disclosure, a DLT format is defined as the magnetic-tape cartridge technology conforming to the specifications of the ECMA 286 standard, which are all well known in the art. The terms front and rear are used throughout in connection with the structure of the DLT cartridge described herein to refer to the side containing the door and to its opposite side, respectively. Left and right refer to the cartridge lateral sides as they appear viewing the cartridge from its front side. The term bottom and top are used with reference to the side of each cartridge that contains the tape reel and hub for connection with a corresponding driving spindle in a drive and to its parallel opposite side, respectively. The terms high and height are used with reference to the direction between the bottom and top sides of the cartridge. Finally, the terms deep and depth are used with reference to the direction between the lateral sides and the interior of the cartridge.

Figure 1:
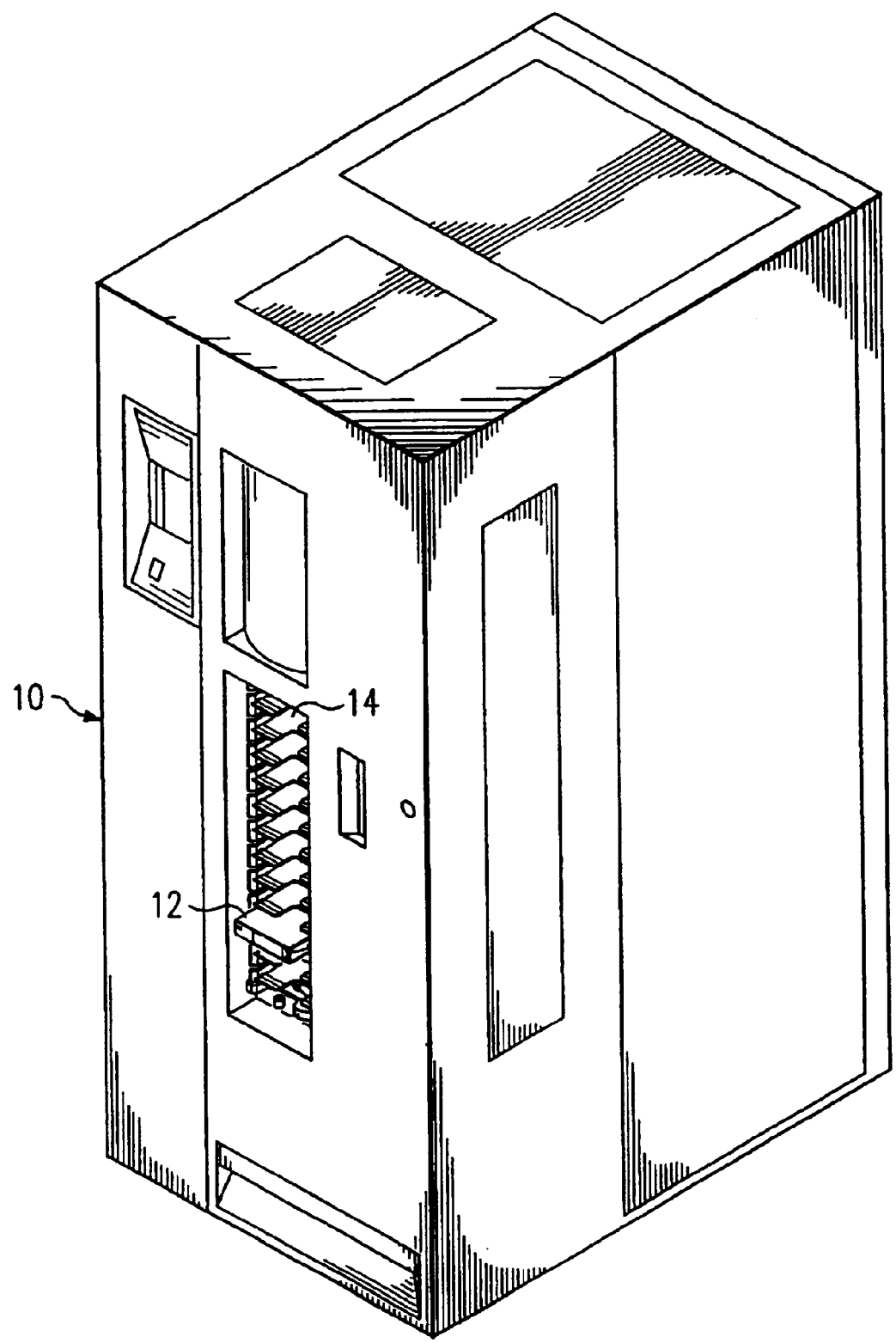
FIG. 1 is a perspective view of a conventional input/output station of an automated library for data cartridges.
Figure 2:
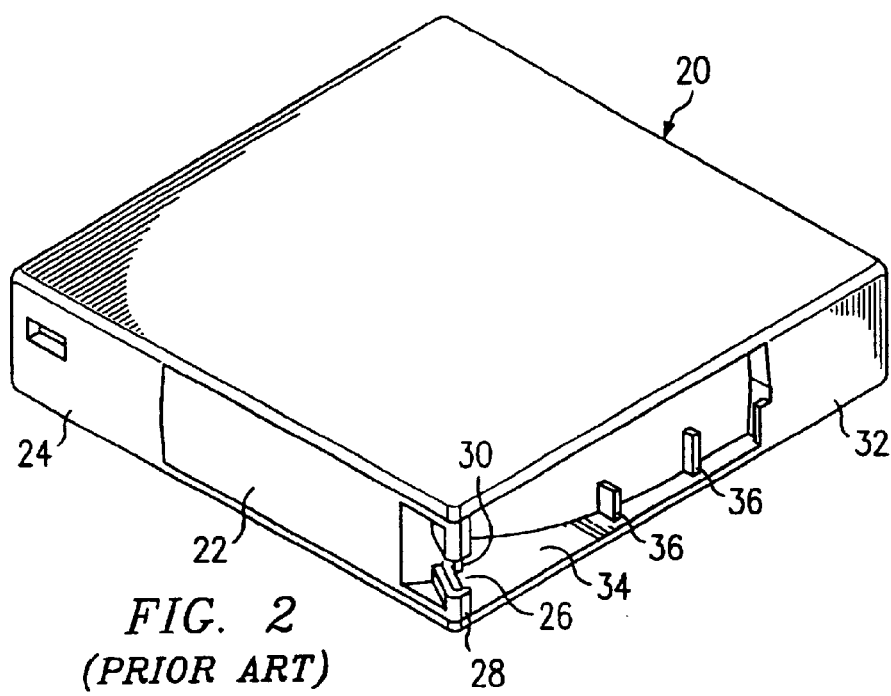
FIG. 2 is a perspective view of a DLT-format cartridge.
Figure 3:
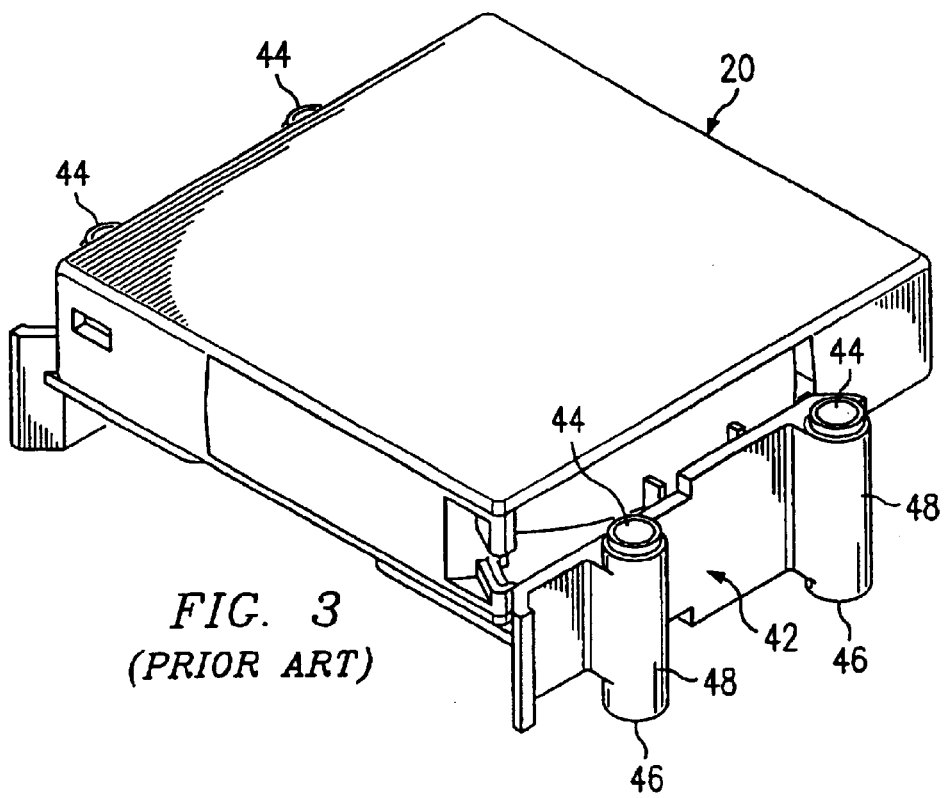
FIG. 3 is a perspective view of the DLT cartridge shown partially inserted into the receiving slot of a cell of the conventional I/O station of FIG. 1.
Figure 4:
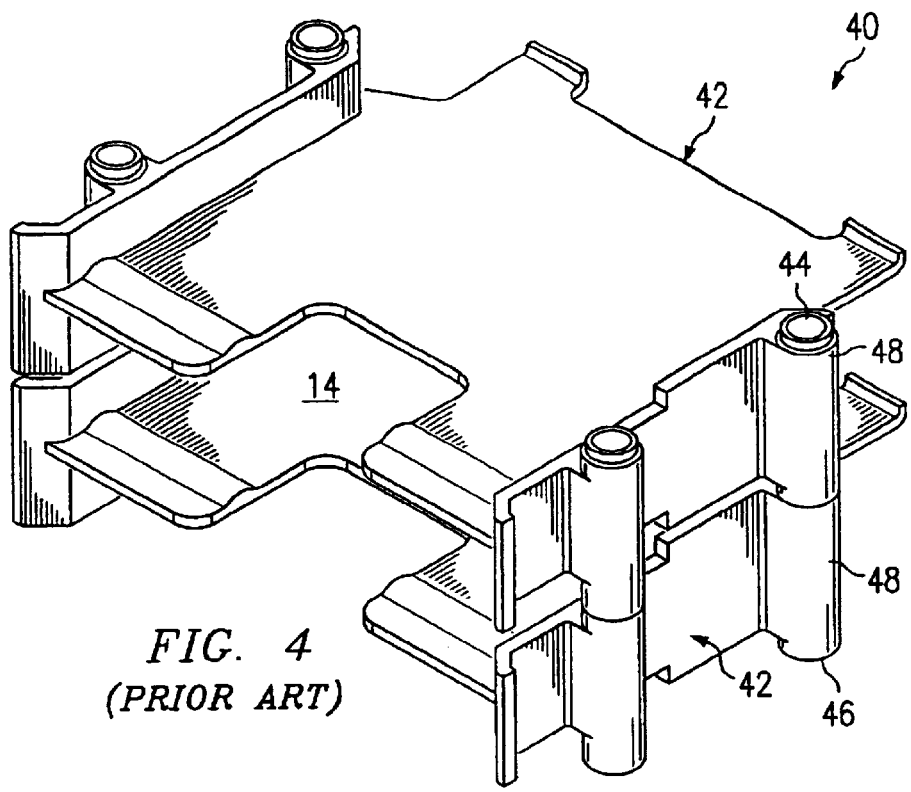
FIG. 4 is a perspective view of a cell of a conventional IBM 3584 Library's I/O station that consists of two half-cell modules stacked together to define a pass-through receiving slot designed to accommodate a DLT cartridge.
Figure 5:
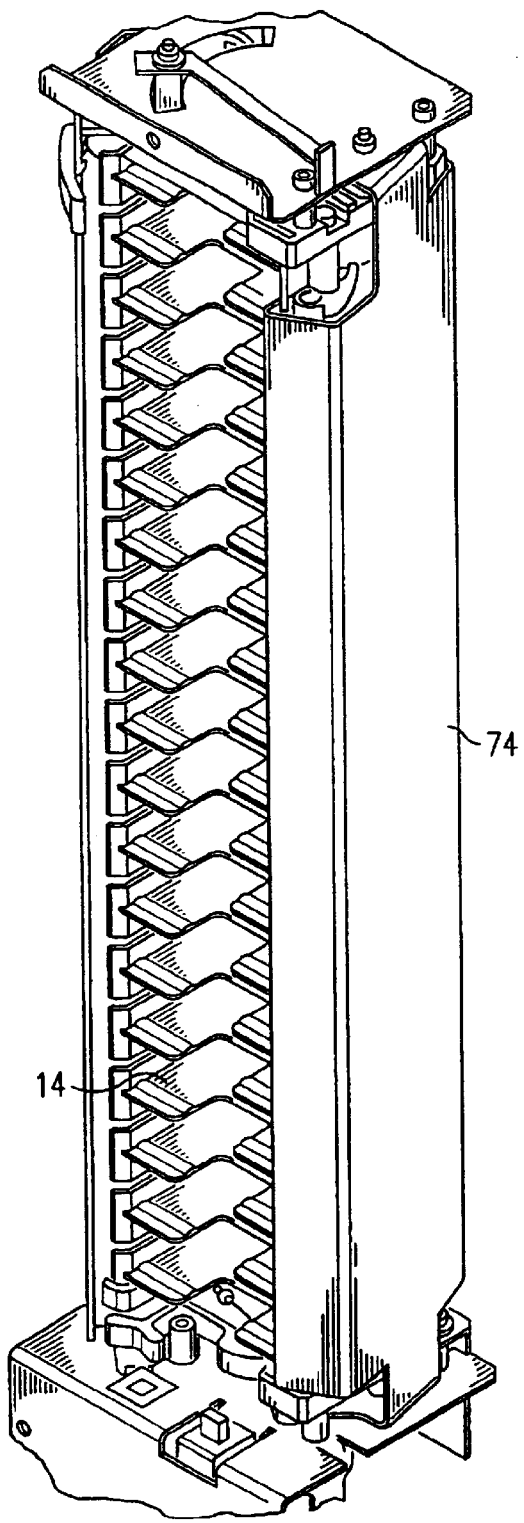
FIG. 5 is a partial perspective view of a stack of cells constructed using the modules of FIG. 4 and of a toggle bracket provided to control access to the slots.

Referring to the drawings, wherein like parts are designated throughout with like numerals and symbols, FIG. 4 illustrates the modular structure of each cell of the I/O station of an IBM 3584 Library, which is used herein to illustrate the invention. Each cell 40 consists of a half-cell module 42 (see also FIG. 3) stacked over an identical component to define an individual slot 14 that conforms substantially to the shape and size of a DLT cartridge with tolerances that allow the easy and convenient insertion of the cartridge through the slot without excessive lateral gaps. Mating ends 44,46 of lateral posts 48 on each side of the modules 42 make it possible to construct multiple-cell I/O stations simply by stacking the modules vertically, as illustrated in FIG. 5.

Figure 7:
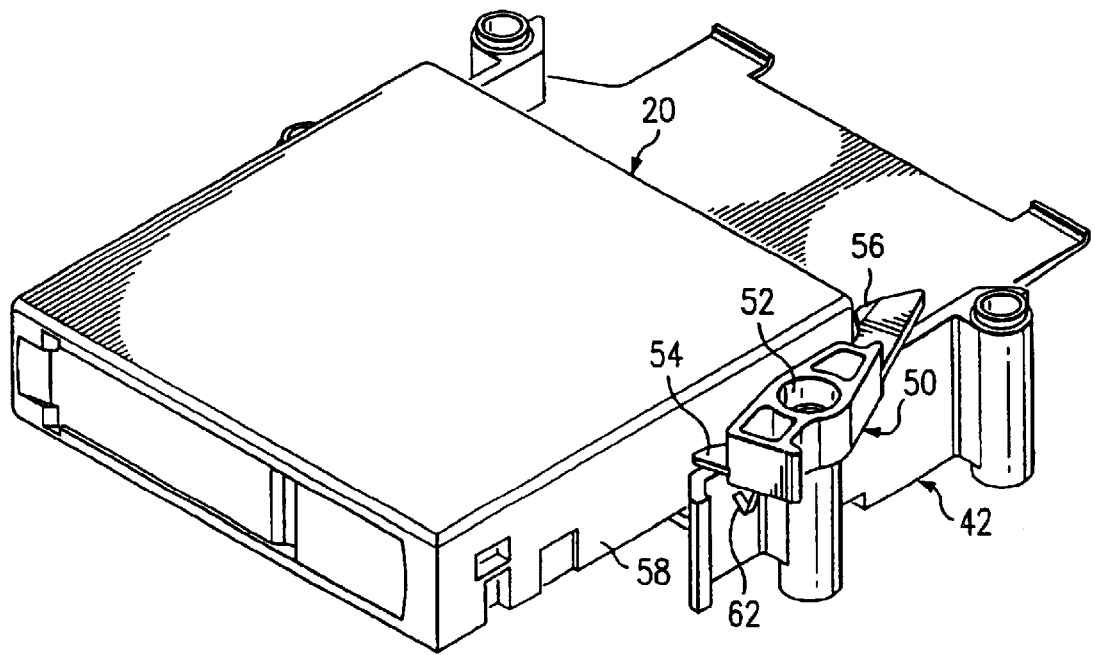
FIG. 7 is partial perspective view of the lockout lever of the invention installed on the front post of a stackable half-cell module showing a DLT cartridge incorrectly inserted into the slot of the unit.
Figure 6:
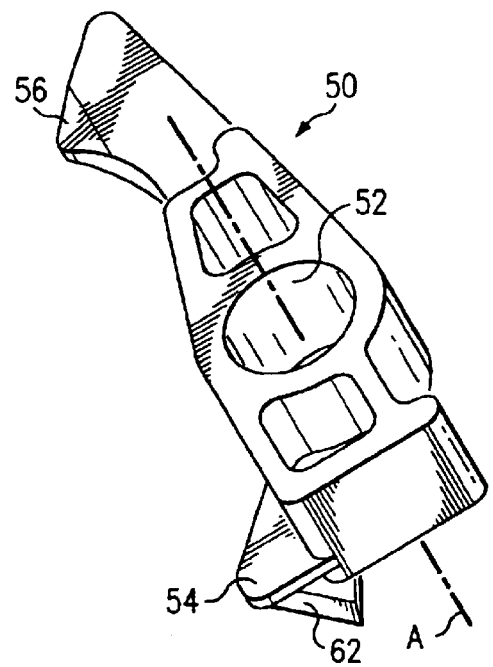
FIG. 6 is a perspective view of a lockout lever according to the invention.

According to the invention, as illustrated in isolation FIG. 6, a lockout lever 50 is provided with a hinge opening 52 adapted for journaled engagement by the mating ends 44,46 of the stacked posts 48 of two half-cell modules 42. Thus, the hinged connection between the opening 52 and the posts 48 provides a fulcrum for the operation of the lockout lever 50. The lever includes a leading blade 54 and a trailing blade 56 extending laterally from the main axis A of the lever passing through the opening 52, such that at least one of the blades encroaches into the space of the slot 14 at all times. Accordingly, as illustrated in the partial view of FIG. 7, the complete insertion into the slot 14 of any cartridge having a flat side 58 facing the lever 50 is prevented by the fact that the corresponding necessary rotation of the trailing edge 56 out of the slot is opposed by the cartridge's side (as shown in FIG. 7, the side 58 is the rear side of the DLT cartridge), which butts against the leading blade 54 as it tries to rotate into the slot. Thus, as also illustrated in top plan view in FIG. 8, the forward progress of the cartridge 20 is precluded by the binding action of the cartridge itself against the hinged lockout level 50.

Figure 9:
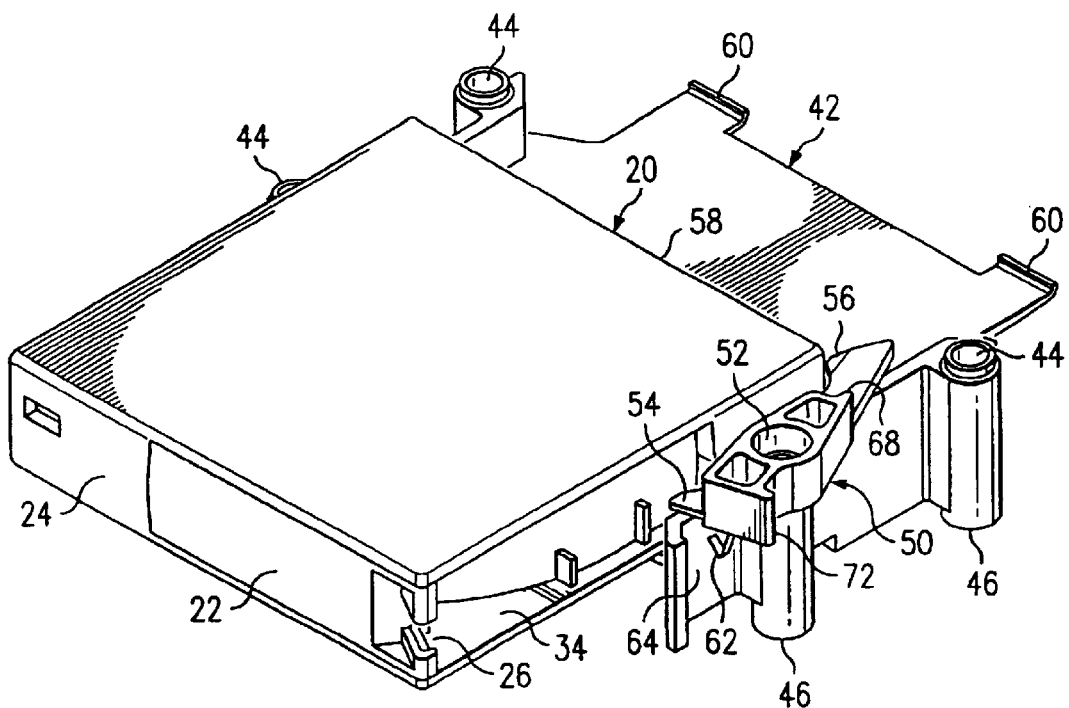
FIG. 9 is partial perspective view of the cell of FIG. 7, but with the DLT cartridge partially inserted correctly into the slot of the unit.
Figure 10:
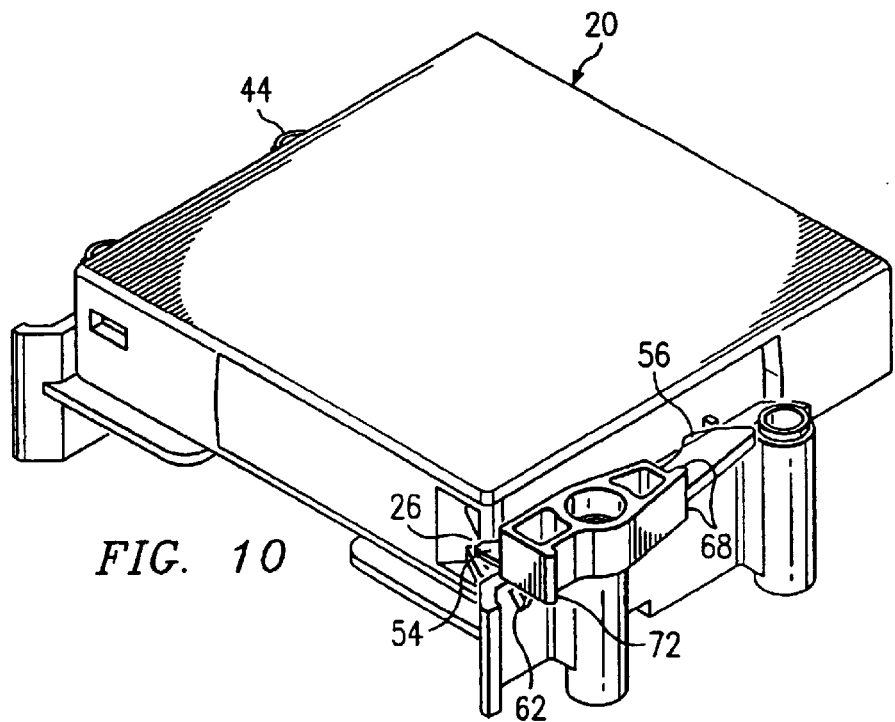
FIG. 10 is the cell of FIG. 9 showing the DLT cartridge fully inserted into the slot as a result of its correct orientation in the slot.

When a DLT cartridge is instead inserted correctly into the slot 14 of an I/O cell, as shown in the partial view of FIG. 9, the cavity 34 in the cartridge's right side 32 is available to accommodate the rotation of the lockout lever 50 and the corresponding penetration of the leading blade 54 into the slot of the cell. Therefore, the forward progress of the cartridge is not prevented and its complete introduction into the I/O cell is accomplished without resistance by the lockout lever, as shown in FIG. 10. Retaining lips 60 in the bottom surface of the cell provide a reference position for the cartridge 20 within the slot 14, so that the cartridge is properly aligned with the library's automated picker operating from the interior of the I/O station.

Figure 8:
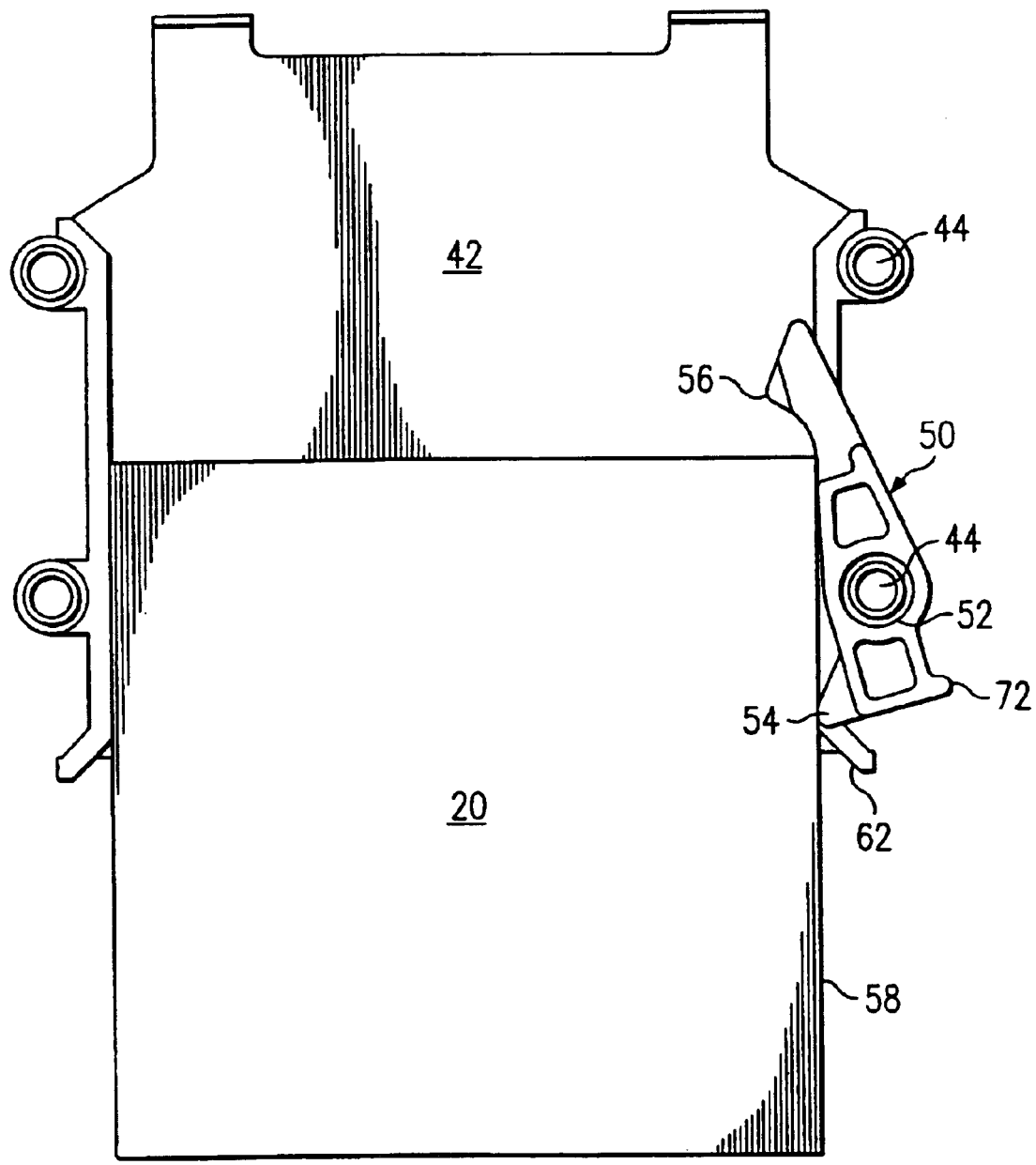
FIG. 8 is a top plan view of the cartridge and half-cell module of FIG. 7.

The lockout lever 50 of the invention is preferably fitted with a spring 62 that urges the leading blade 54 out of the slot 14 by butting against the exterior surface 64 of the lower half-cell module 42 upon which the lever 50 is mounted, as seen in FIG. 9. As a result, the leading blade 54 of the lockout lever rests clear of the slot 14 until the trailing blade 56 is contacted by the cartridge being inserted therethrough, as illustrated in FIGS. 7 and 8. Accordingly, the lockout lever of the invention is normally open for the initial insertion of a cartridge into the slot 14 regardless of whether or not it is being inserted in the correct orientation. If not, the combined action of the two blades 54,56 against the wrong side of the cartridge prevents its full insertion, thereby immediately providing a signal to the operator that the cartridge is oriented incorrectly. On the other hand, if the cartridge slides effortlessly into the slot 14, it is clear that it was inserted correctly.

Figure 11:
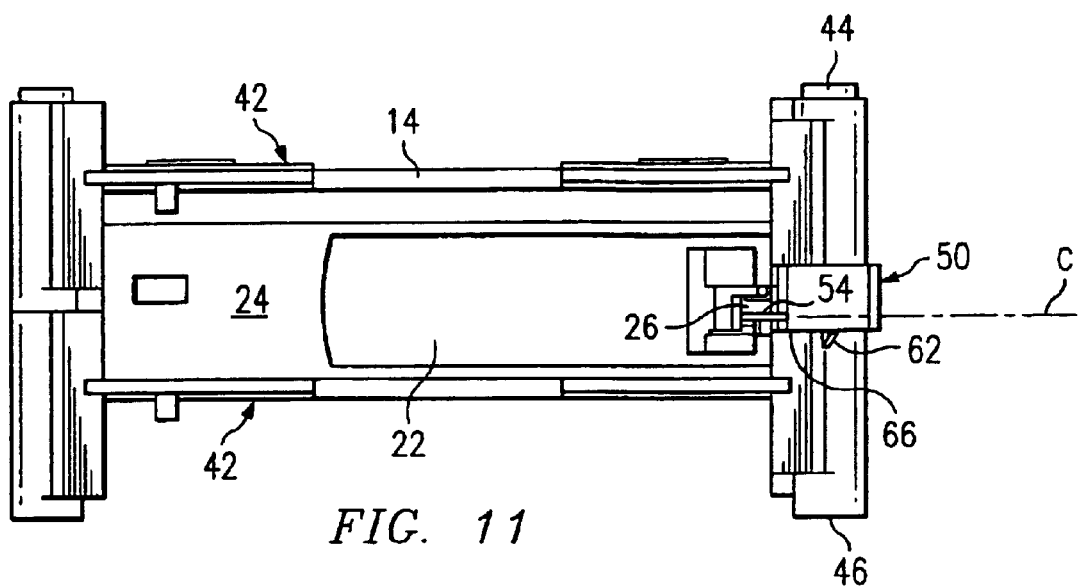
FIG. 11 is an elevational front-side view of a DLT cartridge fully inserted into a slot through the lockout mechanism of the invention, as shown in FIG. 10.
Figure 12:
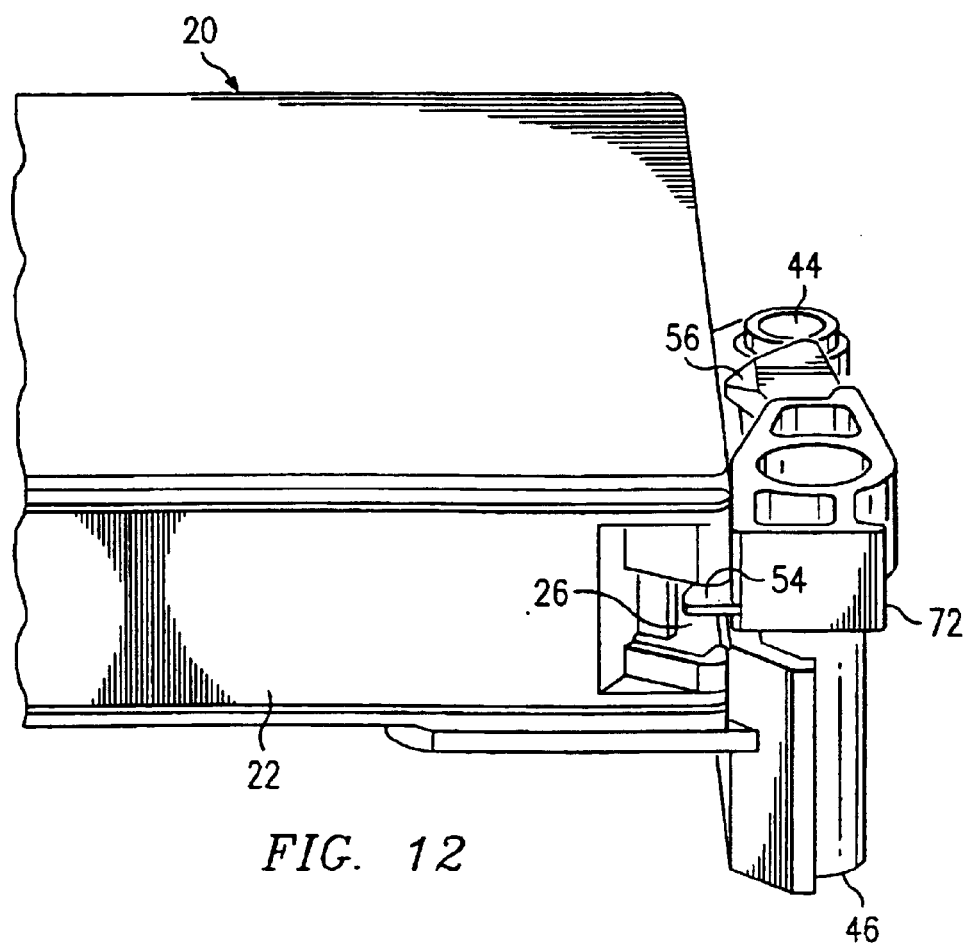
FIG. 12 is a front perspective view of the fully inserted cartridge of FIGS. 10 and 11 clearly illustrating the corresponding position of the lockout lever of the invention.

As clearly shown in FIGS. 10, 11 and 12, when the DLT cartridge is fully inserted into the slot 14, the leading blade 54 of the lockout lever 50 is substantially contained within the gap 26 in the door hinge 28 and is therefore clear of any structure in the cartridge. Thus, the leading blade 54 does not constitute an impediment to the cartridge's forward motion to pass completely through the slot 14 when the cartridge is grabbed by the library's automated picker inside the I/O station. Inasmuch as the standards applicable to DLT cartridges prescribe that the gap 26 should span from 8 mm to 11 mm from the bottom of the cartridge and should be at least 6 mm deep, the leading blade 54 is preferably about 1 mm thick, it extends about 5 mm inward toward the I/O slot, and its section centerline C is about 10 mm above the bottom surface of the slot 14 (see FIG. 11). The lever 50 is preferably approximately 62 mm long and is mounted on the front right post 48 of each I/O cell 40 so that its leading and trailing blades 54,56 extend about 22 mm and 36 mm, respectively, from the blade's axis of rotation. As shown in the top cross-section view of FIG. 13, the trailing blade 56 is preferably sized so that it is completely out of the slot 14 when the leading blade 54 is at its maximum extension therein. Accordingly, the elevational position of the trailing blade 56 is not critical to the operation of the lockout lever 50 according to the invention. In the preferred embodiment, the trailing blade 56 is approximately 3 mm thick at the base and tapers down to about 1 mm at its tip, it extends a maximum of about 12 mm inward toward the I/O slot, and its section centerline is about 15 mm above the bottom surface of the slot. In order to limit the counterclock rotation of the lockout lever and the corresponding penetration of the trailing blade 56 into the cell, the lever 50 may also be provided with a shoulder 68 (see FIG. 10) designed to stop the lever's rotation by butting against the exterior side of the modules 42.

Figure 13:
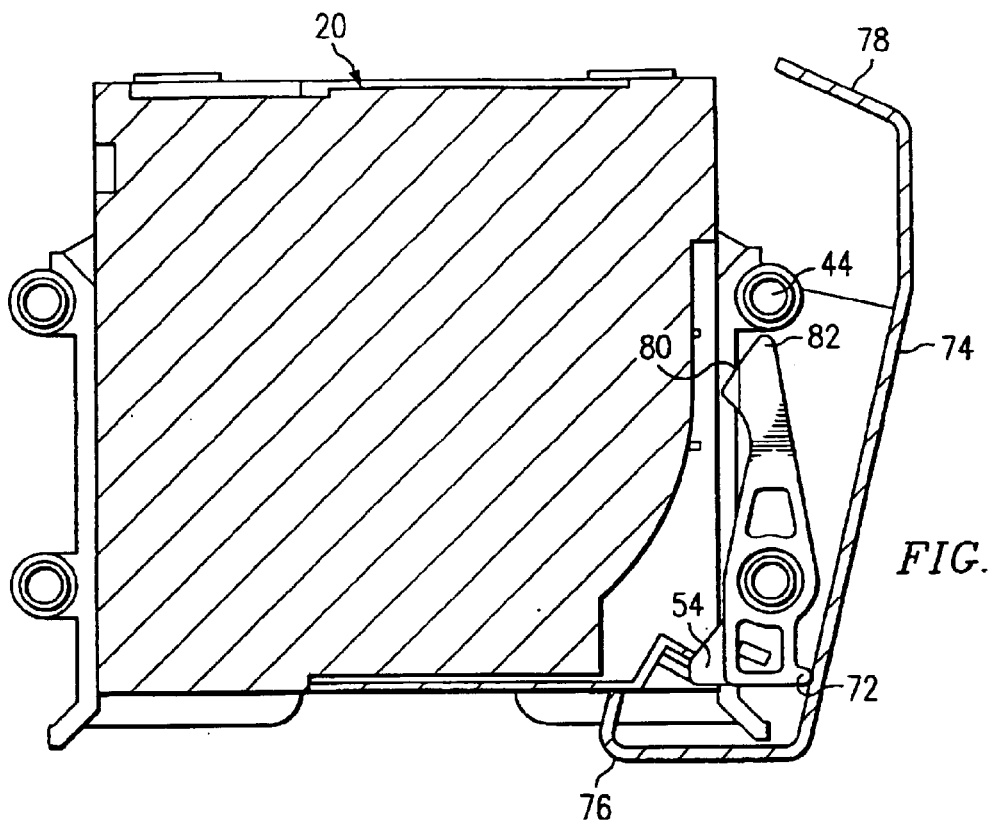
FIG. 13 is a sectioned view of the embodiment of FIG. 11, further showing a toggle bracket in a first position that prevents access to the cells of the I/O station from the exterior side of the I/O station.
Figure 14:
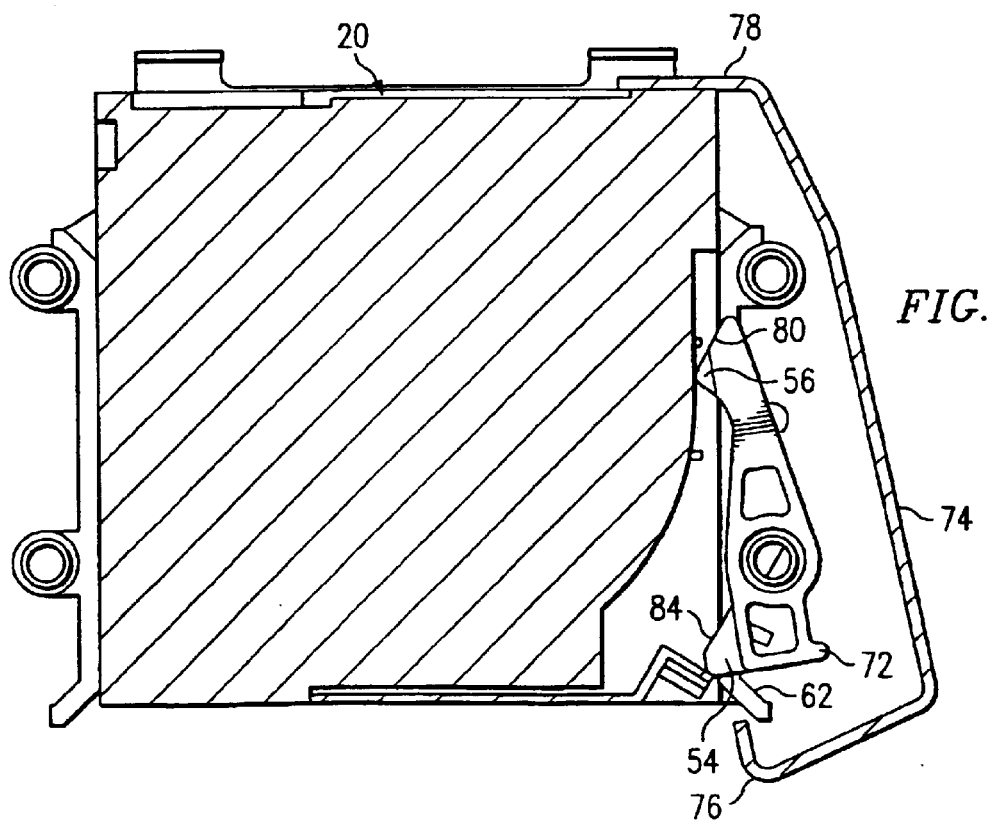
FIG. 14 is the view of FIG. 13, wherein the toggle bracket is shown in a second position that prevents access to the cells of the I/O station from the interior side of the I/O station.

According to another aspect of the invention, the leading end 70 of lockout lever 50 also includes a wing 72 designed to cooperate with a conventional access door or toggle bracket 74 (shown in FIGS. 5 and 13) that is provided to control access to the I/O station both for the manual operation of handling cartridges from the exterior side and for the automated operation of handling cartridges from the interior side of the automated library. When the I/O station is unavailable for exterior access by an operator, the front edge 76 of the toggle bracket 74 partially blocks the front side of the slots 14, while the rear edge 78 is completely out of the way for the library picker to reach the slots from the rear side of the station, as shown in FIG. 13. In order to make the I/O station available for access from the front side, the toggle bracket 74 is rotated such that its front edge 76 is clear of the slots 14 and its rear edge 78 is instead blocking access from the rear side of the station, as illustrated in FIG. 14. The wing 72 of the lockout lever 50 is advantageously sized so that it butts against the toggle bracket 74 when the bracket is closed (FIG. 13), thereby pushing the leading blade 54 fully into the slot of the I/O cell. This ensures that the trailing blade 56 stays out of the slot 14 during operation of the picker and prevents any possible obstruction that might otherwise result from an interaction between the trailing blade 56 and the various structural features in the right side 32 of the DLT cartridge (ribs 36, door hinge 28) while the cartridge is being removed by the library picker. As the toggle bracket 74 swings open, as illustrated by FIG. 14, the wing 72 is released and the spring 62 in the lockout lever pushes the leading blade out of and the trailing blade into the slot 14, thereby facilitating access to and removal of the cartridge by an operator. The rear side 80 of the trailing blade 56 is preferably bezeled outwardly toward its rear end 82 in order to facilitate the removal of the cartridge by an operator from the front side of the I/O station. Similarly, the rear side 84 of the leading blade 54 is also preferably bezeled outwardly toward the hinge opening 52 in order to facilitate its removal.

Thus, a new design for a lockout mechanism is provided that is suitable for implementation in a conventional I/O station of an automated library. The device of the invention prevents the full insertion of any cartridge other than a DLT cartridge that is oriented correctly. Furthermore, the device allows the unimpeded passage of the DLT cartridge through the I/O slot for automated handling by library robots. The lockout lever of the invention is also advantageously designed for installation between each pair of the modular components used to construct a conventional IBM 3584 I/O station. Therefore, the position of each lockout lever is inherently referenced to its corresponding pair of cell components, thereby avoiding the typical alignment problems associated with cumulative errors present when a single reference point is used. Another advantage of the invention is the total absence of interaction between the cartridges and the lockout levers once the cartridges are fully inserted into the I/O station. Yet another advantage is the totally mechanical implementation of the invention, with no need for electrical components or computerized control for carrying out its function.

Various changes in the details, steps and components that have been described may be made by those skilled in the art within the principles and scope of the invention herein illustrated and defined in the appended claims. Therefore, while the invention has been shown and described in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. A lockout mechanism for preventing the insertion of a digital linear tape cartridge into a receiving slot of a cell of an input/output station of a device unless the cartridge is oriented with a rear side facing the slot and a right side with a cavity and a door hinge with a gap facing the lockout mechanism, comprising:

a lever with a leading end, a trailing end, and an intermediate hinge member rotatably mounted on a side of the cell;

a leading blade extending into the slot when the leading end of the lever is rotated toward the slot;

a trailing blade extending toward the slot when the trailing end is rotated toward the slot; and means for urging the leading blade out of the slot;

wherein at least a portion of one of the leading and trailing blades of the lever always extends into the slot as the lever is rotated; and wherein the leading blade is sized to fit within a clearance defined by said cavity and said gap in the cartridge when the leading blade is fully extended into the slot and the cartridge is passed through the slot wherein said lever further includes a wing which butts against a toggle bracket of the input/output station and thereby pushes the leading blade of the lever fully into the slot when a front side of the toggle bracket is closed; the lever includes a shoulder which butts against an outer surface of the cell and thereby limits the penetration of the trailing blade into the slot when a front side of the toggle bracket is open; said leading blade is about 1 mm thick, extends about 5 mm inward toward the slot, has a section centerline about 10 mm above a bottom surface of the slot, and includes a rear bezeled side extending outwardly toward said hinge member of the lever; and said trailing blade is about 3 mm thick at a base thereof and tapers down to about 1 mm at a tip, extends a maximum of about 12 mm inward toward the slot, has a section centerline about 15 mm above a bottom surface of the slot, and includes a rear bezeled side extending outwardly toward the trailing end of the lever.

2. A lockout mechanism for preventing the insertion of a digital linear tape cartridge into a receiving slot of a cell of an input/output station of a device unless the cartridge is oriented with a rear side facing the slot and a right side with a cavity and door hinge with a gap facing the lockout mechanism, comprising:

a lever with a leading end, a trailing end, and an intermediate hinge member rotatably mounted on a side of the cell;

a leading blade extending into the slot when the leading end of the lever is rotated toward the slot;

a trailing blade extending toward the slot when the trailing end is rotated toward the slot; and means for urging the leading blade out of the slot;

wherein at least a portion of one of the leading and trailing blades of the lever always extends into the slot as the lever is rotated;

wherein the leading blade is sized to fit within a clearance defined by said cavity and said gap in the cartridge when the leading blade is fully extended into the slot and the cartridge is passed through the slot; and wherein said leading blade is about 1 mm thick, extends about 5 mm inward toward the slot, and has a section centerline about 10 mm above a bottom surface of the slot.

3. The lockout mechanism of claim 2, wherein said trailing blade is about 3 mm thick at a base thereof and tapers down to about 1 mm at a tip, extends a maximum of about 12 mm inward toward the slot, and has a section centerline about 15 mm above a bottom surface of the slot.

4. An input/output station with a pass-through cell for exchanging digital linear tape cartridges with a device, wherein each cartridge has a right side with a cavity and a door hinge with a gap and said cartridge may be inserted into the station only when the cartridge is oriented with a rear side thereof facing the cell and with the right side thereof facing a predetermined side of the cell, said station comprising:

a receiving slot defined by said cell of the station;

a lever with a leading end, a trailing end, and an intermediate hinge member rotatably mounted on said predetermined side of the cell;

a leading blade extending into the slot when the leading end of the lever is rotated toward the slot;

a trailing blade extending toward the slot when the trailing end is rotated toward the slot; and means for urging the leading blade out of the slot, said urging means being incorporated within the station and separate from said cartridge;

wherein at least a portion of one of the leading and trailing blades of the lever always extends into the slot as the lever is rotated; and wherein the leading blade is sized to fit within a clearance defined by said cavity and said gap in the cartridge when the leading blade is fully extended into the slot and the cartridge is passed through the slot.

5. The input/output station of claim 4, wherein said trailing blade includes a rear bezeled side extending outwardly toward the trailing end of the lever.

6. The input/output station of claim 4, wherein said leading blade includes a rear bezeled side extending outwardly toward said hinge member of the lever.

7. The input/output station of claim 4, further including a wing which butts against a toggle bracket of the input/output station and thereby pushes the leading blade of the lever fully into the slot when a front side of the toggle bracket is closed.

8. The input/output station of claim 4, further including a shoulder which butts against an outer surface of the cell and thereby limits the penetration of the trailing blade into the slot when a front side of a toggle bracket is open.

9. The input/output station of claim 4, wherein said cell includes a lateral post and said hinge member in the lever consists of an opening adapted for journaled engagement with said lateral post.

10. The input/output station of claim 4, wherein said cell includes two half-cell modular components with mating lateral posts and said hinge member in the lever consists of an opening adapted for journaled engagement with one of said lateral posts.

11. The input/output station of claim 4, wherein said lever further includes a wing which butts against a toggle bracket of the input/output station and thereby pushes the leading blade of the lever fully into the slot when a front side of the toggle bracket is closed; the lever includes a shoulder which butts against an outer surface of the cell and thereby limits the penetration of the trailing blade into the slot when a front side of the toggle bracket is open; said leading blade is about 1 mm thick, extends about 5 mm inward toward the slot, has a section centerline about 10 mm above a bottom surface of the slot, and includes a rear bezeled side extending outwardly toward said hinge member of the lever; and said trailing blade is about 3 mm thick at a base thereof and tapers down to about 1 mm at a tip, extends a maximum of about 12 mm inward toward the slot, has a section centerline about 15 mm above a bottom surface of the slot, and includes a rear bezeled side extending outwardly toward the trailing end of the lever.

12. An input/output station with a pass-through cell for exchanging digital linear tape cartridges with a device, wherein each cartridge has a right side with a cavity and a door hinge with a gap and said cartridge may be inserted into the station only when the cartridge is oriented with a rear side thereof facing the cell and with the right side thereof facing a predetermined side of the cell, said station comprising:
- a receiving slot defined by said cell of the station;
- a lever with a leading end, a trailing end, and an intermediate hinge member rotatably mounted on said predetermined side of the cell;
- a leading blade extending into the slot when the leading end of the lever is rotated toward the slot;
- a trailing blade extending toward the slot when the trailing end is rotated toward the slot; and
- means for urging the leading blade out of the slot;
- wherein at least a portion of one of the leading and trailing blades of the lever always extends into the slot as the lever is rotated;
- wherein the loading blade is sized to fit within a clearance defined by said cavity and said gap in the cartridge when the leading blade is fully extended into the slot and the cartridge is passed through the slot; and
- wherein said leading blade is about 1 mm thick, extends about 5 mm inward toward the slot, and has a section centerline about 10 mm above a bottom surface of the slot.

13. The input/output station of claim 12, wherein said trailing blade is about 3 mm thick at a base thereof and tapers down to about 1 mm at a tip, extends a maximum of about 12 mm inward toward the slot, and has a section centerline about 15 mm above a bottom surface of the slot.

14. An automated library for storage of digital linear tape cartridges having a right side with a cavity and a door hinge with a gap, comprising:
- an input/output station with at least one pass-through cell for exchanging digital linear tape cartridges with the library;
- a receiving slot defined by each of said at least one cell of the station;
- a lever with a leading end, a trailing end, and an intermediate hinge member rotatably mounted on a predetermined side of the cell;
- a leading blade extending into the slot when the leading end of the lever is rotated toward the slot;
- a trailing blade extending toward the slot when the trailing end is rotated toward the slot; and
- means for urging the leading blade out of the slot, said urging means being incorporated within the library and separate from said cartridge;
- wherein at least a portion of one of the leading and trailing blades of the lever always extends into the slot as the lever is rotated; and
- wherein the leading blade is sized to fit within a clearance defined by said cavity and said gap in the cartridge when the leading blade is fully extended into the slot and the cartridge is passed through the slot;
- whereby said cartridge may be inserted into the cell only when the cartridge is oriented with a rear side thereof facing the cell and with the right side thereof facing said predetermined side of the cell.

15. The automated library of claim 14, wherein said trailing blade includes a rear bezeled side extending outwardly toward the trailing end of the lever.

16. The automated library of claim 14, wherein said leading blade includes a rear bezeled side extending outwardly toward said hinge member of the lever.

17. The automated library of claim 14, further including a wing which butts against a toggle bracket of the input/output station and thereby pushes the leading blade of the lever fully into the slot when a front side of the toggle bracket is closed.

18. The automated library of claim 14, further including a shoulder which butts against an outer surface of the cell and thereby limits the penetration of the trailing blade into the slot when a front side of a toggle bracket is open.

19. The automated library of claim 14, wherein said cell includes a lateral post and said hinge member in the lever consists of an opening adapted for journaled engagement with said lateral post.

20. The automated library of claim 14, wherein said cell includes two half-cell modular components with mating lateral posts and said hinge member in the lever consists of an opening adapted for journaled engagement with one of said lateral posts.

21. The automated library of claim 14, wherein said lever further includes a wing which butts against a toggle bracket of the input/output station and thereby pushes the leading blade of the lever fully into the slot when a front side of the toggle bracket is closed; the lever includes a shoulder which butts against an outer surface of the cell and thereby limits the penetration of the trailing blade into the slot when a front side of the toggle bracket is open; said leading blade is about 1 mm thick, extends about 5 mm inward toward the slot, has a section centerline about 10 mm above a bottom surface of the slot, and includes a rear bezeled side extending outwardly toward said hinge member of the lever; and said trailing blade is about 3 mm thick at a base thereof and tapers down to about 1 mm at a tip, extends a maximum of about 12 mm inward toward the slot, has a section centerline about 15 mm above a bottom surface of the slot, and includes a rear bezeled side extending outwardly toward the trailing end of the lever.

22. An automated library for storage of digital linear tape cartridges having a right side with a cavity and a door hinge with a gap, comprising:

an input/output station with at least one pass-through cell for exchanging digital linear tape cartridges with the library;

a receiving slot defined by each of said at least one cell of the station;

a lever with a leading end, a trailing end, and an intermediate hinge member rotatably mounted on a predetermined side of the cell;

a leading blade extending into the slot when the leading end of the lever is rotated toward the slot;

a trailing blade extending toward the slot when the trailing end is rotated toward the slot; and means for urging the leading blade out of the slot;

wherein at least a portion of one of the leading and trailing blades of the lever always extends into the slot as the lever is rotated; and wherein the leading blade is sized to fit within a clearance defined by said cavity and said gap in the cartridge when the leading blade is fully extended into the slot and the cartridge is passed through the slot;

whereby said cartridge may be inserted into the cell only when the cartridge is oriented with a rear side thereof facing the cell and with the right side thereof facing said predetermined side of the cell; and wherein said leading blade is about 1 mm thick, extends about 5 mm inward toward the slot, and has a section centerline about 10 mm above a bottom surface of the slot.

23. The automated library of claim 22, wherein said trailing blade is about 3 mm thick at a base thereof and tapers down to about 1 mm at a tip, extends a maximum of about 12 mm inward toward the slot, and has a section centerline about 15 mm above a bottom surface of the slot.

24. A lockout mechanism for preventing the insertion of a digital linear tape cartridge into a receiving slot of a cell of an input/output station of a device unless the cartridge is oriented with a rear side facing the slot and a right side with a cavity and a door hinge with a gap facing the lockout mechanism, comprising:

a lever with a leading end, a trailing end, and an intermediate hinge member rotatably mounted on a side of the cell;

a leading blade extending into the slot when the leading end of the lever is rotated toward the slot;

a trailing blade extending toward the slot when the trailing end is rotated toward the slot; and means for urging the leading blade out of the slot, said urging means being incorporated within the lockout mechanism and separate from said cartridge;

wherein at least a portion of one of the leading and trailing blades of the lever always extends into the slot as the lever is rotated; and wherein the leading blade is sized to fit within a clearance defined by said cavity and said gap in the cartridge when the leading blade is fully extended into the slot and the cartridge is passed through the slot.

25. The lockout mechanism of claim 24, wherein said trailing blade includes a rear bezeled side extending outwardly toward the trailing end of the lever.

26. The lockout mechanism of claim 24, wherein said leading blade includes a rear bezeled side extending outwardly toward said hinge member of the lever.

27. The lockout mechanism of claim 24, further including a wing which butts against a toggle bracket of the input/output station and thereby pushes the leading blade of the lever fully into the slot when a front side of the toggle bracket is closed.

28. The lockout mechanism of claim 24, further including a shoulder which butts against an outer surface of the cell and thereby limits the penetration of the trailing blade into the slot when a front side of a toggle bracket is open.

29. The lockout mechanism of claim 24, wherein said cell includes a lateral post and said hinge member in the lever consists of an opening adapted for journaled engagement with said lateral post.

30. The lockout mechanism of claim 24, wherein said cell includes two half-cell modular components with mating lateral posts and said hinge member in the lever consists of an opening adapted for journaled engagement with one of said lateral posts.

* * * * *

UNITED STATES PATENT AND TRADEMARK OFFICE
CERTIFICATE OF CORRECTION

| | |
|---|---|
| PATENT NO. | : 6,943,982 B2 |
| DATED | : September 13, 2005 |
| INVENTOR(S) | : Steven Martin Flaherty et al. |

It is certified that error appears in the above-identified patent and that said Letters Patent is hereby corrected as shown below:

<u>Column 9,</u>
Line 60, replace "loading" with -- leading --.

Signed and Sealed this

Twenty-second Day of November, 2005

JON W. DUDAS
*Director of the United States Patent and Trademark Office*